United States Patent
Gu et al.

(10) Patent No.: US 9,210,432 B2
(45) Date of Patent: Dec. 8, 2015

(54) LOSSLESS INTER-FRAME VIDEO CODING

(71) Applicant: Google Inc., Mountain View, CA (US)

(72) Inventors: Qunshan Gu, Hayward, CA (US); Yaowu Xu, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 358 days.

(21) Appl. No.: 13/647,092

(22) Filed: Oct. 8, 2012

(65) Prior Publication Data

US 2014/0098855 A1    Apr. 10, 2014

(51) Int. Cl.
*H04N 7/32* (2006.01)
*H04N 19/12* (2014.01)
*H04N 19/139* (2014.01)
*H04N 19/176* (2014.01)
*H04N 19/61* (2014.01)

(52) U.S. Cl.
CPC ............ *H04N 19/12* (2014.11); *H04N 19/139* (2014.11); *H04N 19/176* (2014.11); *H04N 19/61* (2014.11)

(58) Field of Classification Search
CPC . H04N 19/124; H04N 19/147; H04N 19/176; H04N 19/593; H04N 19/61
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,150,209 A | 9/1992 | Baker et al. | |
| 5,337,086 A | 8/1994 | Fujinami | |
| 5,398,068 A | 3/1995 | Liu et al. | |
| 5,512,952 A | 4/1996 | Iwamura | |
| 5,708,473 A | 1/1998 | Mead | |
| 5,731,840 A | 3/1998 | Kikuchi et al. | |
| 5,886,742 A | 3/1999 | Hibi et al. | |
| 5,991,447 A | 11/1999 | Eifrig et al. | |
| 6,005,980 A | 12/1999 | Eifrig et al. | |
| 6,272,179 B1 | 8/2001 | Kadono | |

(Continued)

FOREIGN PATENT DOCUMENTS

| | | |
|---|---|---|
| EP | 0634873 B1 | 9/1998 |
| EP | 1903698 | 3/2008 |

OTHER PUBLICATIONS

Nokia, Inc., Nokia Research Center, "MVC Decoder Description", Telecommunication Standardization Sector, Study Period 1997-2000, Geneva, Feb. 7, 2000, 99 pp.

(Continued)

*Primary Examiner* — Jay Patel
*Assistant Examiner* — Neil Mikeska
(74) *Attorney, Agent, or Firm* — Young Basile Hanlon & MacFalane P.C.

(57) ABSTRACT

Blocks of a frame of a video stream can be encoded using lossless inter-frame prediction encoding. The compression ratio of lossless inter-frame encoding can be improved by first examining the magnitude of a motion vector used to perform inter-frame prediction. If the magnitude of the motion vector is small, the residual generated by the inter-prediction can be entropy coded and included in the encoded bitstream. If the magnitude of the motion vector is greater than a threshold, the residual can be encoded using lossy encoding and then decoded and subtracted from the original residual. The resulting difference residual is encoded using lossless encoding and included in the output bitstream along with the lossy encoded residual, permitting the block to be decoded with no loss at a decoder.

16 Claims, 6 Drawing Sheets

(56) References Cited

U.S. PATENT DOCUMENTS

| | | | |
|---|---|---|---|
| 6,289,049 B1 | 9/2001 | Kim et al. | |
| 6,314,208 B1 | 11/2001 | Konstantinides et al. | |
| 6,359,929 B1 | 3/2002 | Boon | |
| 6,363,119 B1* | 3/2002 | Oami | 375/240.03 |
| 6,381,277 B1 | 4/2002 | Chun et al. | |
| 6,650,704 B1 | 11/2003 | Carlson et al. | |
| 6,654,419 B1 | 11/2003 | Sciram et al. | |
| 6,711,211 B1 | 3/2004 | Lainema | |
| 6,735,249 B1 | 5/2004 | Karczewicz et al. | |
| 6,907,079 B2 | 6/2005 | Gomila et al. | |
| 7,158,681 B2 | 1/2007 | Persiantev | |
| 7,277,587 B2 | 10/2007 | Sun | |
| 7,333,544 B2 | 2/2008 | Kim et al. | |
| 7,602,851 B2 | 10/2009 | Lee et al. | |
| 7,602,997 B2 | 10/2009 | Young | |
| 7,689,051 B2 | 3/2010 | Mukerjee | |
| 7,983,338 B2 | 7/2011 | Takamura et al. | |
| 2002/0031272 A1 | 3/2002 | Bagni et al. | |
| 2003/0202705 A1 | 10/2003 | Sun | |
| 2005/0265444 A1* | 12/2005 | Kim | 375/240.1 |
| 2007/0019729 A1* | 1/2007 | Nakagomi et al. | 375/240.13 |
| 2007/0065026 A1 | 3/2007 | Lee et al. | |
| 2008/0123747 A1* | 5/2008 | Lee et al. | 375/240.16 |
| 2008/0211901 A1* | 9/2008 | Civanlar et al. | 348/14.09 |
| 2009/0190660 A1* | 7/2009 | Kusakabe et al. | 375/240.13 |
| 2010/0104021 A1 | 4/2010 | Schmit | |
| 2010/0177819 A1 | 7/2010 | Jeon et al. | |
| 2010/0194910 A1* | 8/2010 | Matsuo et al. | 348/222.1 |
| 2010/0195715 A1 | 8/2010 | Liu et al. | |
| 2010/0226436 A1* | 9/2010 | Dane et al. | 375/240.16 |
| 2011/0026591 A1 | 2/2011 | Bauza et al. | |
| 2011/0243229 A1 | 10/2011 | Kim et al. | |
| 2013/0077671 A1* | 3/2013 | Tanaka | 375/240.02 |
| 2013/0077696 A1 | 3/2013 | Zhou | |
| 2014/0098856 A1 | 4/2014 | Gu et al. | |

OTHER PUBLICATIONS

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Chen, Xing C., et al.; "Quadtree Based Adaptive Lossy Coding of Motion Vectors", IEEE 1996, 4 pp.
Wright, R. Glenn, et al.; "Multimedia—Electronic Technical Manual for ATE", IEEE 1996, 3 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Strobach, Peter; "Tree-Structured Scene Adaptive Coder", IEEE Transactions on Communications, vol. 38, No. 4, Apr. 1990, 10 pp.
Steliaros, Michael K., et al.; "Locally-accurate motion estimation for object-based video coding", SPIE vol. 3309, 1997, 11 pp.
Martin, Graham R., et al.; "Reduced Entropy Motion Compensation Using Variable Sized Blocks", SPIE vol. 3024, 1997, 10 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Guillotel, Philippe, et al.; "Comparison of motion vector coding techniques", SPIE vol. 2308, 1994, 11 pp.
Orchard, Michael T.; "Exploiting Scene Structure in Video Coding", IEEE 1991, 5 pp.
Liu, Bede, et al.; "A simple method to segment motion field for video coding", SPIE vol. 1818, Visual Communications and Image Processing 1992, 10 pp.
Ebrahimi, Touradj, et al.; "Joint motion estimation and segmentation for very low bitrate video coding", SPIE vol. 2501, 1995, 12 pp.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wiegand, Thomas, et al.; "Long-Term Memory Motion-Compensated Prediction", Publication Unknown, Date Unknown, 15 pp.
Zhang, Kui, et al.; "Variable Block Size Video Coding With Motion Prediction and Motion Segmentation", SPIE vol. 2419, 1995, 9 pp.
Chen, Michael C., et al.; "Design and Optimization of a Differentially Coded Variable Block Size Motion Compensation System", IEEE 1996, 4 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Nicolas, H., et al.; "Region-based motion estimation using deterministic relaxation schemes for image sequence coding", IEEE 1992, 4 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Mozilla, "Introduction to Video Coding Part 1: Transform Coding", Video Compression Overview, Mar. 2012, 171 pp.
Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video

(56) References Cited

OTHER PUBLICATIONS coding for generic audiovisual services. H.264. Version 1. International Telecommunication Union. Dated May, 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Jun-Ren Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.
Patent Cooperation Treaty Invitation to Pay Fees, International Searching Authority International Application No. PCT/US2013/063722 mailed on Dec. 9, 2013.
Schwarz H. et al.: "SNR-scalable extension of H.264/AVC", Image Processing, 2004. ICIP 2004 International Conference on Singapore Oct. 24-27, 2004.

* cited by examiner

LOSSLESS INTER-FRAME VIDEO CODING

TECHNICAL FIELD

This disclosure relates to encoding and decoding visual data, such as video stream data, for transmission or storage using inter prediction.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Compression techniques can be lossy or lossless. Lossy compression techniques generate video streams that are acceptable for most video viewing. However, some applications, such as video editing or medical imaging, for example, may require lossless video encoding. Lossy video encoding can result in encoded video bitstreams having a higher compression ratio than lossless encoding. Compression ratio can be defined as the ratio of compressed size to uncompressed size of the video data.

SUMMARY

Disclosed herein are aspects of systems, methods and apparatuses for encoding and decoding a video stream. One aspect of the teachings herein is a method for encoding a digital video stream including a plurality of frames. The method includes selecting a block of a frame of the plurality of frames, the block being one of a plurality of blocks of the frame, performing inter-prediction on the block using an inter-frame prediction motion vector to calculate a first residual block, and selecting one of a first coding process or a second coding process to encode the first residual block based on a comparison of a magnitude of the inter-frame prediction motion vector to a threshold value. If the first coding process is selected, the method includes performing the first coding process by entropy coding the first residual block, and including the entropy coded first residual block in an encoded video bitstream. If the second coding process is selected, the method includes performing the second coding process by encoding the first residual block to form an encoded residual block, entropy coding the encoded residual block to include in the encoded video bitstream, decoding the encoded residual block to form a second residual block, subtracting the second residual block from the first residual block to form a difference residual, entropy coding the difference residual block to form an encoded difference residual block, and including the encoded difference residual block in the encoded video bitstream.

Another aspect of the teachings herein is an apparatus for encoding a digital video stream including a plurality of frames, the apparatus including a method and a processor. The processor is configured to execute instructions stored in the memory to select a block of a frame of the plurality of frames, the block being one of a plurality of blocks of the frame, perform inter-prediction on the block using an inter-frame prediction motion vector to calculate a first residual block, select one of a first coding process or a second coding process to encode the block based on a comparison of a magnitude of the inter-frame prediction motion vector to a threshold value, if the first coding process is selected, perform the first coding process by entropy coding the first residual block and including the entropy coded first residual block in an encoded video bitstream, and if the second coding process is selected, perform the second coding process by encoding the first residual block to form an encoded residual block, entropy code the encoded residual block to include in the encoded video bitstream, decoding the encoded residual block to form a second residual block, subtracting the second residual block from the first residual block to form a difference residual, entropy coding the difference residual block to form an encoded difference residual block, and including the encoded difference residual block in the encoded video bitstream.

The teachings herein also describe a method for decoding an encoded video bitstream including a plurality of encoded frames. The method includes receiving an encoded residual block of a frame of the plurality of encoded frames, the encoded residual block being one of a plurality of encoded residual blocks of the frame and the encoded residual block formed by determining whether an encoded difference residual block is associated with the encoded residual block and determining whether the encoded residual block was inter-predicted. When the encoded residual block was inter-predicted and no encoded difference residual block is associated with the encoded residual block, the method includes entropy decoding the encoded residual block to form a residual block, generating a reference block using an inter-frame prediction motion vector, and adding the reference block to the residual block to reconstruct a first block of a frame of a digital video stream. When the encoded residual block was inter-predicted and the encoded difference residual block is associated with the encoded residual block, the method includes decoding the encoded residual block to form a second residual block, entropy decoding the encoded difference residual block to form a difference residual block, adding the second residual block to the difference residual block, generating the reference block using the inter-frame prediction motion vector, and adding the reference block to a sum of the second residual block and the difference residual block to reconstruct the first block of the frame of the digital video stream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
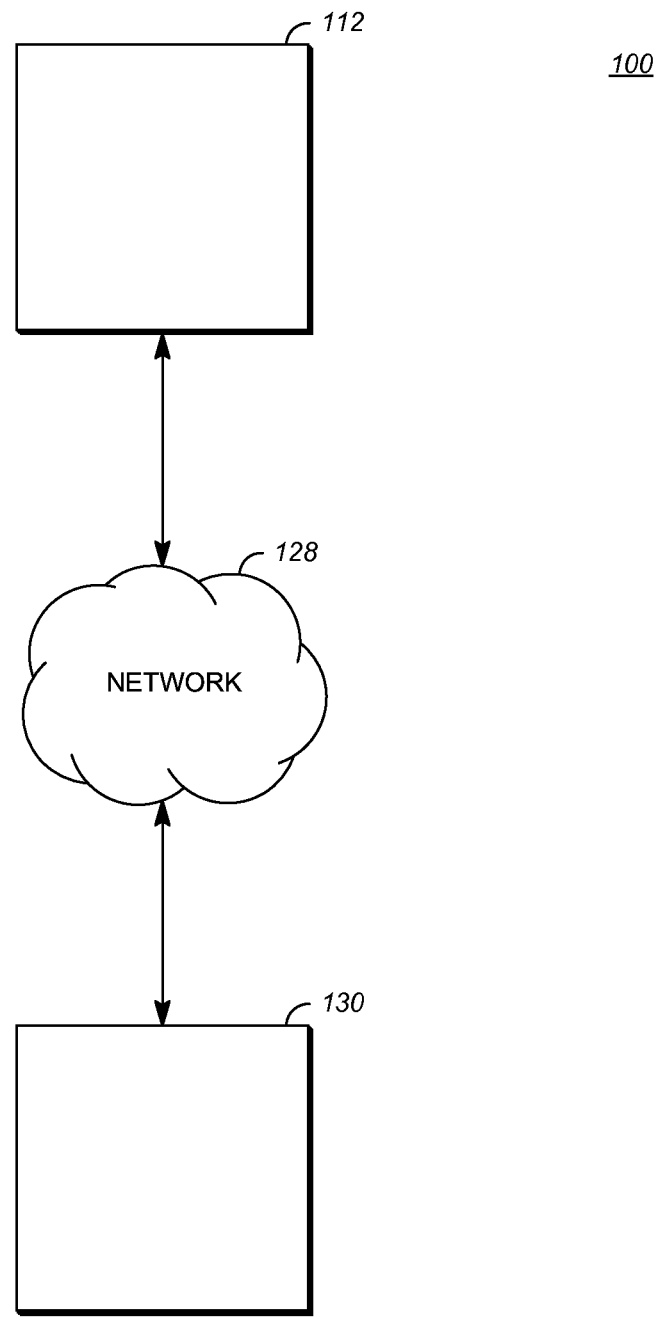
FIG. 1 is a schematic of a video encoding and decoding system.

Digital video is used for various purposes including, for example, remote business meetings via video conferencing, high definition video entertainment, video advertisements, and sharing of user-generated videos. Compressing such digital video is often desirable. Lossy encoding can achieve high compression ratios by employing transformations and quantization techniques that are not 100% reversible, in the sense that encoding and decoding image data using these techniques can result in output video data that does not match the input video data.

In contrast, lossless video stream coding can result in an output video stream substantially identical to the input video stream. Generally, lossless video stream coding has limitations on compression ratios.

The teachings herein can improve compression ratios for lossless encoding for blocks of a video stream coded using inter-frame prediction (also called inter-prediction herein). In an example of the teachings herein, inter-prediction creates a residual block, also called a residual, which represents the difference between a predicted block and the actual block being encoded. After generation of a residual, further processing can be performed by first examining the motion vector used to perform inter-prediction. If the magnitude of the motion vector is smaller than a threshold value, the residual can be small enough that directly encoding the residual in the spatial domain or transform domain using lossless entropy encoding ultimately provides an efficient lossless compression.

If the magnitude of the motion vector is larger than the threshold value, the first residual that results from inter-prediction can be further encoded using a transform followed by quantization and entropy encoding. This results in an encoded first residual that represents an example of lossy encoding. Decoding the encoded first residual involves constructing a second residual by performing the encoding steps in reverse order. The decoded second residual generally differs from the first residual due to the errors introduced by lossy encoding. The lossy second residual may be subtracted from the first residual to yield a third residual, also called a difference residual, which is then encoded using lossless entropy coding. The encoded first residual and encoded third residual can then be included in the output encoded video bitstream. Upon receipt by a decoder, the encoded third and first residuals may be decoded and the lossy second residual and lossless third residual added together form a lossless residual. The lossless residual can then be further processed using interprediction to re-form the original block. Having a motion vector magnitude larger than a threshold value can result in the combination of the lossy-encoded first residual and lossless-encoded third residual having fewer bits than direct lossless encoding of the first residual, resulting in bit savings in the encoded video bitstream.

First discussed below are environments in which aspects of this disclosure can be implemented, and then details of certain implementations are explained.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
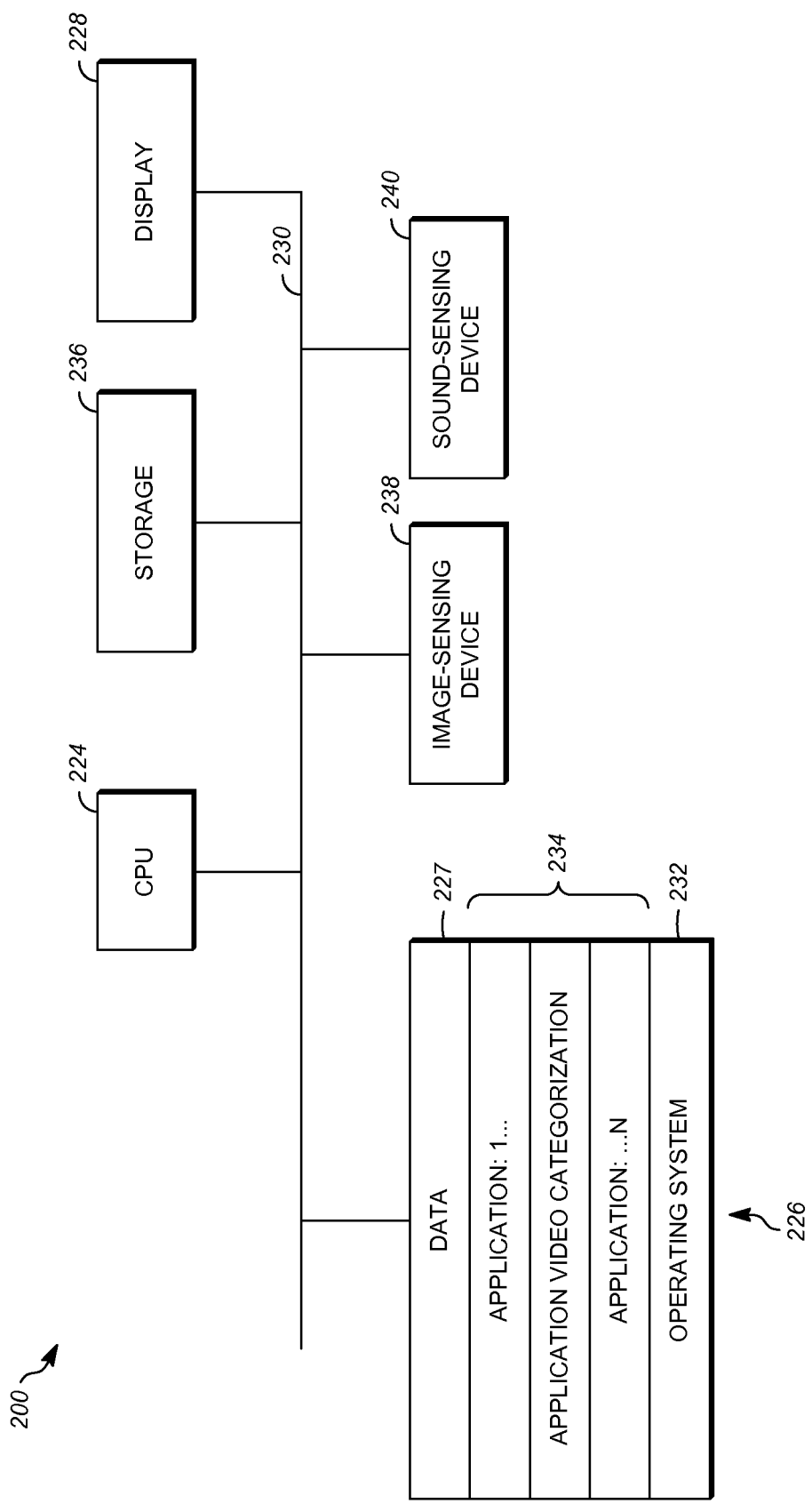
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, application programs 234 including at least one program that permits CPU 224 to perform the methods described here. For example, application programs 234 can include applications 1 through N, which further include a video communication application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
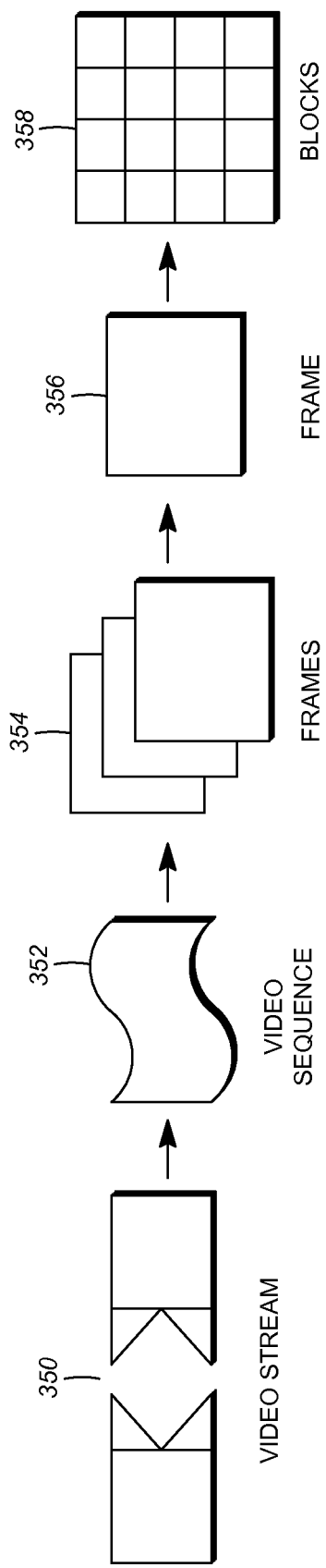
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, single frame 356 can be divided into a series of blocks 358, which can contain data corresponding to, for example, 16×16 pixels in frame 356. Blocks 358 can also be arranged in planes of data. For example, a corresponding block in each plane can respectively contain luminance and chrominance data for the pixels of the block. Blocks 358 can also be of any other suitable size such as 16×8 pixel groups or 8×16 pixel groups and can be further subdivided into smaller blocks depending on the application. Unless otherwise noted, the terms block and macroblock are used interchangeably herein.

Figure 4:
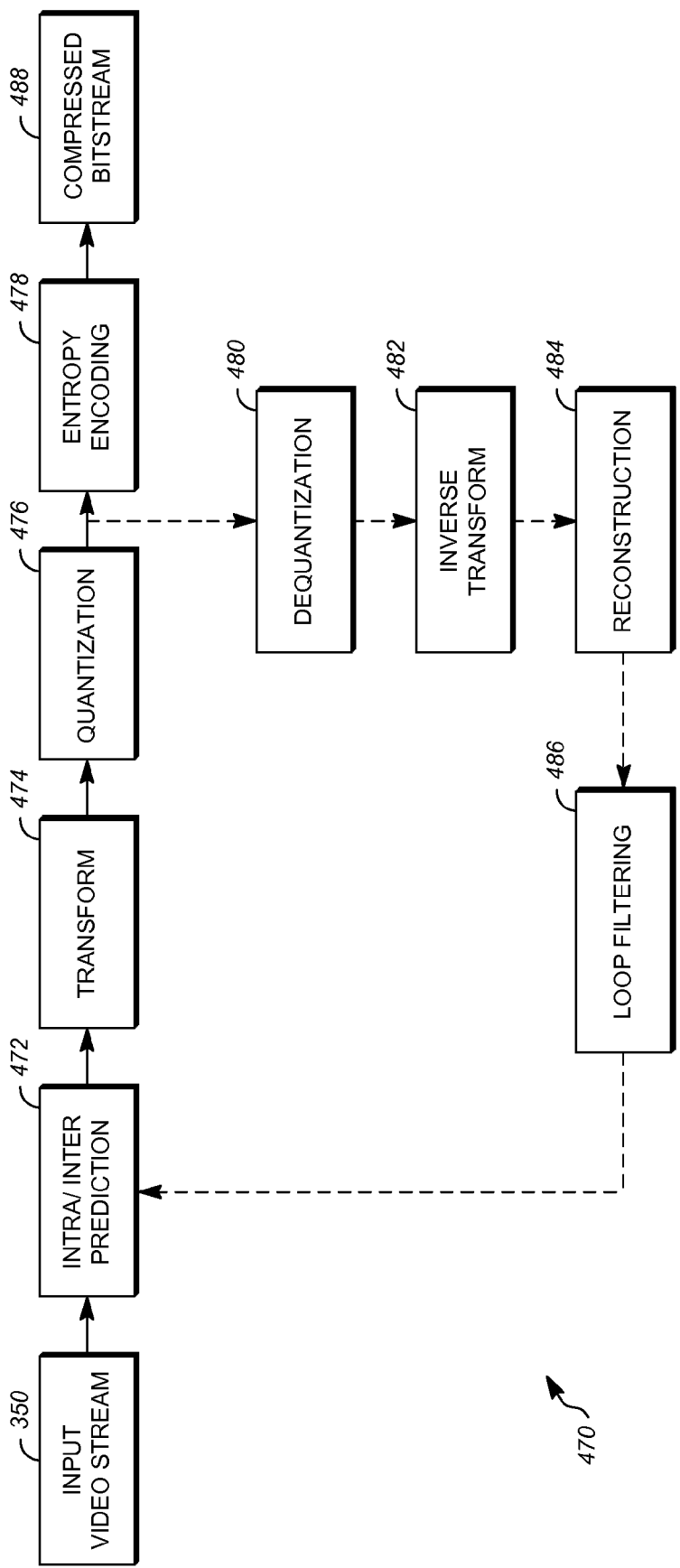
FIG. 4 is a block diagram of a video compression system in accordance with an implementation.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 including planes 357 within the video stream 350 can be processed in units of blocks. At the intra/inter prediction stage 472, each block can be encoded using intra-frame prediction (within a single frame) or inter-frame prediction (from frame to frame). In any case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
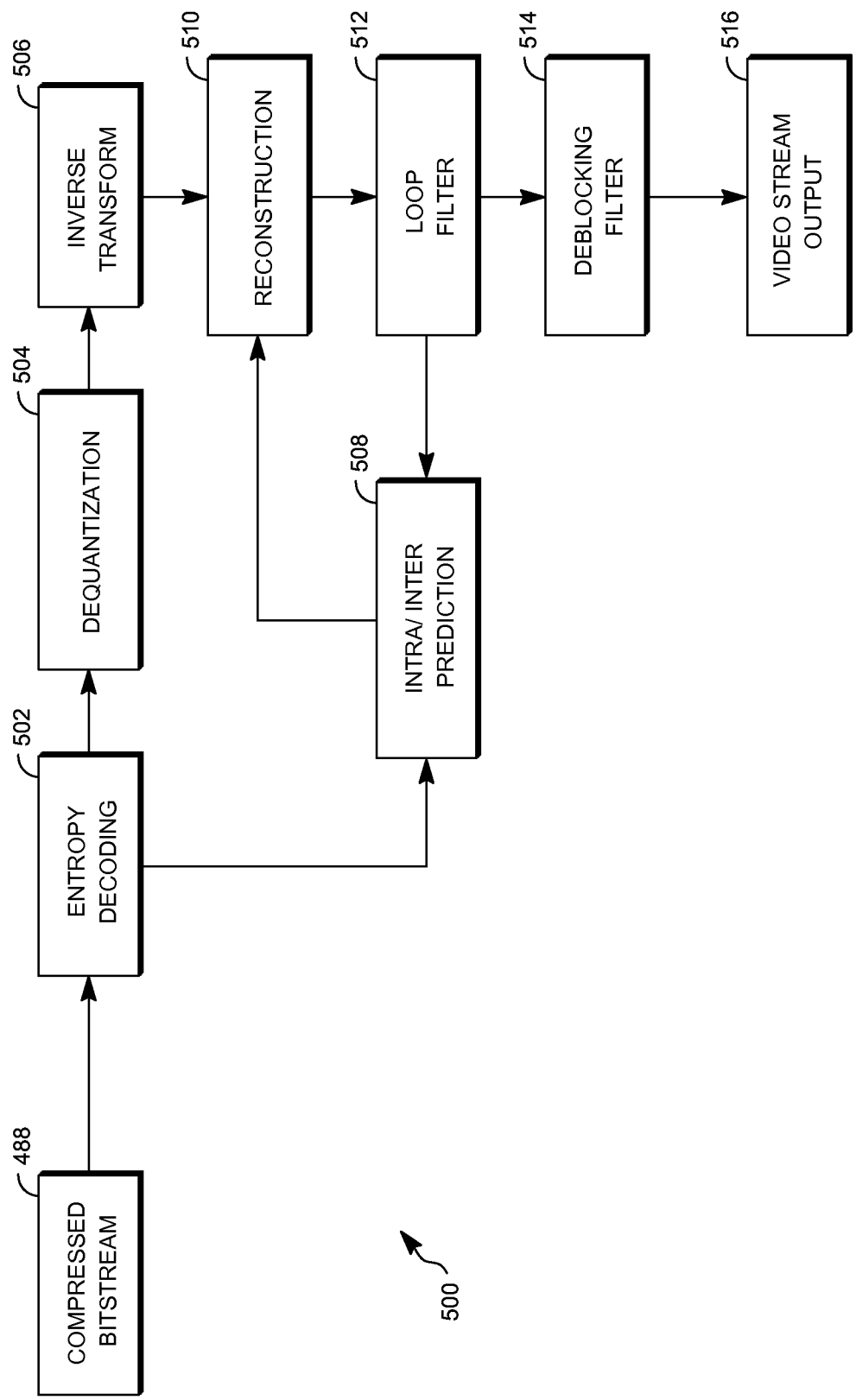
FIG. 5 is a block diagram of a video decompression system in accordance with another implementation.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

Figure 6:
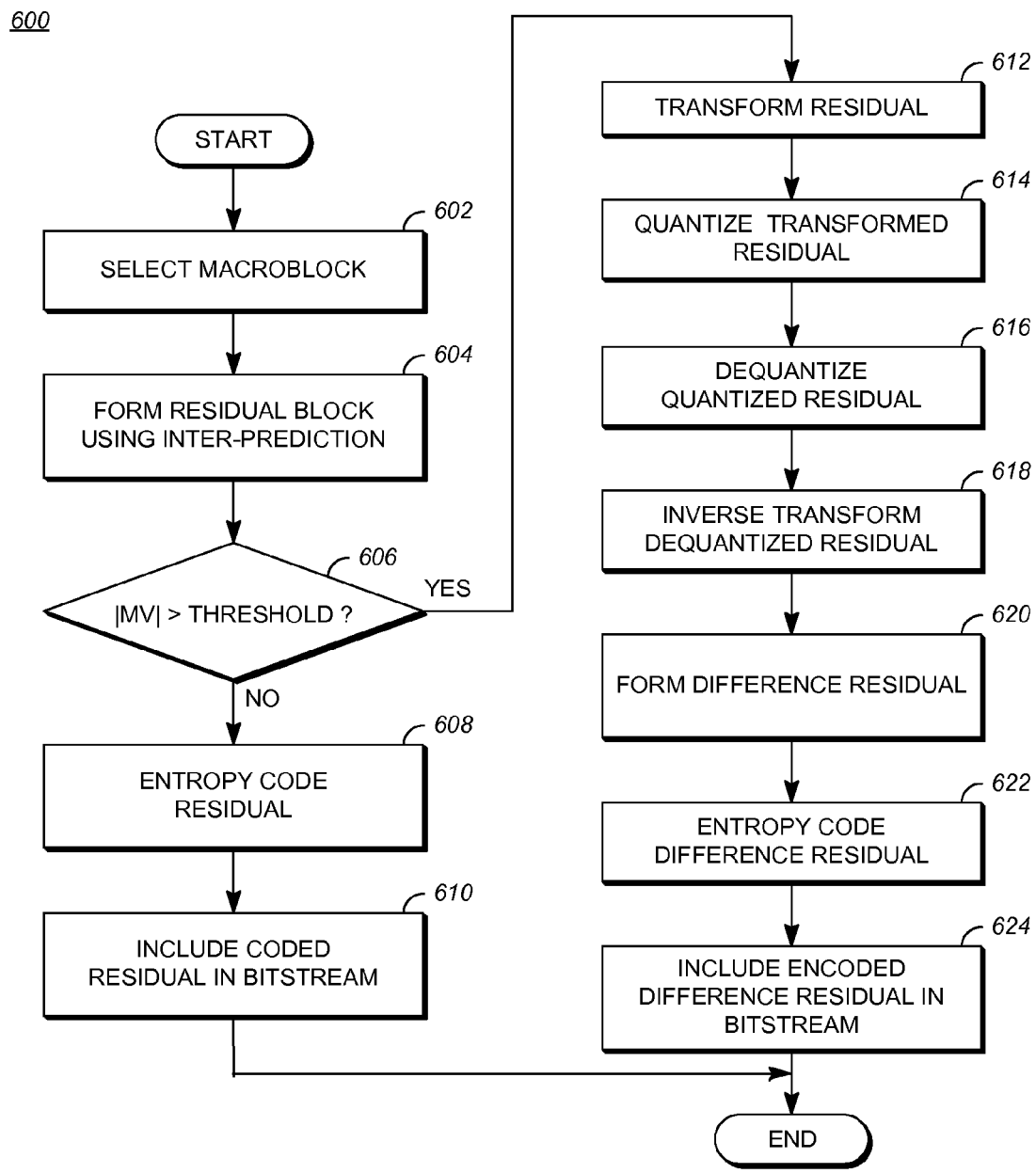
FIG. 6 is a flowchart of a process for lossless encoding of a video stream using inter-prediction according to an aspect of the teachings herein.

FIG. 6 is a flowchart of a process 600 for lossless encoding of a video stream using inter-prediction according to an aspect of the teachings herein. Process 600 can be implemented in an encoder such as encoder 400 to select lossless encoding using inter-frame prediction (or inter-prediction) modes used by encoder 400 to encode a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a block from a frame of video data is selected for processing. Select can mean choose, indicate, determine or otherwise select in any manner whatsoever. As shown in FIG. 3, a video stream can include frames of video data that include macroblocks or blocks. Blocks can be processed in raster scan order starting with the block at the upper left hand corner and proceeding along successive rows until all of the blocks of the frame are processed. Other scan orders can be used with the teachings herein.

At step 604, the selected block can be processed using inter-prediction to form a residual block. This step assumes that a determination has already been made to encode the selected block using inter-prediction as opposed to intra-prediction. Strategies used to determine whether or not to use inter-prediction include calculating test residuals for inter-frame prediction and various intra-prediction modes and comparing the results. The magnitude of the test residuals can be compared to select a prediction mode having the smallest residual value, for example.

As mentioned briefly above, inter-prediction is a process that uses pixel data from a reference frame or frames (e.g., temporally close frames to the current frame) to predict the pixel values of a block. In the case where inter-prediction is used, pixel data from a block from the reference frame can be translated according to a calculated motion vector and subtracted from the current block to form a residual block, also called a first residual herein.

At step 606, the magnitude of the motion vector is tested to see if it is greater than a threshold value. The threshold value can be a predetermined value determined by encoding one or more video streams and selecting the value that yields the best image quality with the lowest bit count, for example. Thus, the threshold value used can be predetermined based on previous processing, for example, and used for all of the blocks of a frame or video stream. In other aspects, a threshold can be selected, frames or blocks processed using the selected threshold and the results compared to results obtained using other values for the threshold. In this case, a threshold value that yields an output video bitstream with the fewest bits can be selected for each residual block or a single threshold for the entire frame can be selected. More processing time spent encoding may result in more bit savings in the output encoded video bitstream.

If the magnitude of the motion vector is less than or equal to the threshold value, it may indicate that inter-prediction using the block translated by that motion vector results in a good prediction of the current block such that the resulting residual pixel values will likely be small. Small residual pixel values can result in a small number of bits to be entropy encoded and included in the encoded video bitstream and may not benefit from additional compression processing. As a result, when the magnitude of the motion vector is less than or equal to the threshold value, process 600 advances to step 608.

At step 608, the first residual can be coded using entropy coding as mentioned in relation to FIG. 4. Entropy coding is a lossless coding operation that reduces the number of bits to be included in the output encoded video bitstream by, for example, replacing repeating strings of bits with a code denoting the string.

At step 610, the entropy coded first residual can be included in the encoded video bitstream. Bits can be added to a header, such as a block header in the encoded video bitstream, to indicate which type of prediction and coding has been performed on the block to guide a decoder in decoding the block losslessly. After step 610, process 600 ends for the current block and can be started for the next block in the scan order.

In contrast to the processing of steps 608 and 610, process 600 advances to step 612 when the magnitude of the motion vector used for inter-prediction is greater than the threshold value at step 606. At step 612, the first residual is further coded by transforming the residual pixels using a transform, for example a DCT as discussed in relation to stage 474 of FIG. 4. The next step in encoding the first residual is to quantize the transformed residual in step 614 as described in relation to stage 476 of FIG. 4. Quantization reduces the number of discrete states occupied by the transformed pixel data to reduce the number of bits used to represent the data.

The quantizer or quantization value used in step 614 can be a preselected level for each block of a frame or for the entire video sequence. Alternatively, and as part of the quantization of step 614, an optimal value can be selected or determined by performing steps 614, 616, 618 and 620 on the transformed residual block using more than one quantization value and comparing the results. A quantization value can be selected that yields the largest reduction in the number of bits in the quantized residual block while maintaining acceptable fidelity in the de-quantized residual block, for example. The number of bits is referred to as a bit cost, and the reduction is referred to a bit savings. The quantization adjustment acts as an energy distribution control from the transform domain to the spatial domain, so that the optimal distribution can be obtained to minimize the cost of coding. The adjustment in the block level may best suit the local statistics of the image. It has been shown that this local optimization by adjusting quantization values in the block level can save a considerable number of the total bits, compared with using frame level quantization control.

Following step 614, the quantized first residual can be entropy coded and included in the encoded video bitstream to be output by process 600. This entropy encoded first residual can also be stored in memory or using any storage media available to process 600 to be included in the encoded video bitstream at a later time. At this point or at any point in the process, bits can be added to one or more headers in the encoded video bitstream to indicate which type of prediction and coding has been performed on the block to guide a decoder in decoding the block.

At step 616, the quantized first residual from step 614 is de-quantized as a first step in reconstructing the first residual. At step 618, the de-quantized residual is inverse transformed to form a decoded residual block. The decoded residual block is called a second residual since it is not identical to the original, first residual formed at step 604. Instead, the second residual has differences in pixel values introduced by the lossy compression in steps 612 and 614.

Next, at step 620, the second residual output from step 618 is subtracted from the first residual formed in step 604 to form a difference residual block (also called a difference residual or third residual) that reflects the differences in pixel values introduced by the lossy compression of the first residual. When decoding a block encoded according to this technique, adding the difference residual to the second residual can recreate the first residual losslessly, eliminating the unwanted changes in the reconstructed data otherwise resulting from lossy compression.

At step 622, the difference residual is entropy coded. As mentioned above, entropy coding is lossless. Therefore, when the encoded difference residual is entropy decoded, the difference residual will be restored to the same state it was in before entropy coding. That is, the difference residual is subject to lossless compression so that, when decoded, its content is identical to its original content within calculation errors due to rounding, etc. At step 624, the encoded difference residual can be included in the output encoded video bitstream. Bits can be set in a header such as the block header in the output encoded video bitstream to inform the decoder that the difference block is included in the bitstream for use in decoding the block. Process 600 then ends for the current block and repeats for each block of the frame.

As mentioned above with the description of step 604, process 600 as illustrated assumes that the block selected in step 602 is to be encoded using inter-prediction. In a variation of process 600, a step could be added to query whether the block is to be encoded using inter-prediction or intra-prediction. If the block is to be inter-predicted, process 600 advances to step 606 as previously discussed. If the block is to be intra-predicted, process 600 could end for the current block, thus resulting in a conventional coding process for the current block. Alternatively, the current block that is to be intra-predicted could be encoded according to steps 612-624 after a residual is formed using intra-prediction.

When a decoder, such as decoder 500, receives the encoded bitstream, the encoded first residual of a predicted block can be entropy decoded (using, for example, arithmetic coding) to produce a set of quantized transform coefficients. The quantized transform coefficients can then be dequantized and then inverse transformed to produce the second residual. The encoded difference residual can be entropy decoded and added to the second residual to recreate the first residual. Using header information decoded from the compressed bitstream, an intra/inter prediction stage such as intra/inter prediction stage 508 can create the same prediction block as was created in encoder 400. At reconstruction stage 510, the prediction block can be added to the first residual to create a reconstructed block. One or more filters can be applied to the reconstructed block before the block is output as part of an output video stream.

By entropy encoding the difference residual in step 622 and including the entropy coded difference residual in the output encoded video bitstream along with the encoded first residual, a decoder can perform lossless decoding of the block while saving bits in comparison to simply entropy encoding the original residual. Bits can be set in a header in the output encoded video bitstream to inform the decoder that both a difference residual and an encoded residual are included in the bitstream for use in decoding the block.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a digital video stream including a plurality of frames, the method comprising:
    selecting a block of a frame of the plurality of frames, the block being one of a plurality of blocks of the frame;
    performing, using a processor, inter-prediction on the block using an inter-frame prediction motion vector to calculate a first residual block by:
        generating a reference block using the inter-frame prediction motion vector; and
        obtaining a difference between the block and the reference block as the first residual block;
    selecting one of a first coding process or a second coding process to encode the first residual block based on a comparison of a magnitude of the inter-frame prediction motion vector to a threshold value;
    if the first coding process is selected, performing the first coding process as a lossless encoding process by:
        entropy coding the first residual block; and
        including the entropy coded first residual block in an encoded video bitstream; and
    if the second coding process is selected, performing the second coding process as a lossless encoding process by:
        encoding the first residual block to form an encoded residual block using a lossy encoding process;
        entropy coding the encoded residual block to include in the encoded video bitstream;
        decoding the encoded residual block to form a second residual block;
        subtracting the second residual block from the first residual block to form a difference residual;
        entropy coding the difference residual block to form an encoded difference residual block; and
        including the encoded difference residual block in the encoded video bitstream.

2. The method of claim 1 wherein selecting the one of the first coding process or the second coding process comprises:
    selecting the first coding process when an absolute value of the magnitude is less than or equal to the threshold value; and
    selecting the second coding process when the absolute value of the magnitude is greater than the threshold value.

3. The method of claim 1 wherein encoding the first residual block comprises:
    transforming the first residual block to form a transformed residual block; and
    quantizing the transformed residual block using a quantization value to form a quantized residual block; and
    wherein decoding the encoded residual block comprises:

de-quantizing the transformed residual block to form a de-quantized second residual block; and inverse transforming the de-quantized second residual block to form the second residual block.

4. The method of claim 3 wherein the quantization value is a block-specific quantization value.

5. The method of claim 1, further comprising:

selecting a second block of the plurality of blocks of the frame;

performing intra-prediction on the second block to calculate a second residual block;

performing the second coding process using the second residual block by:

encoding the second residual block to form a second encoded residual block;

entropy encoding the second encoded residual block to include in the encoded video bitstream;

decoding the second encoded residual block to form a third residual block;

subtracting the third residual block from the second residual block to form a second difference residual;

entropy coding the second difference residual block to form a second encoded difference residual block; and including the second encoded difference residual block in the encoded video bitstream.

6. The method of claim 1, further comprising:

selecting a second block of the plurality of blocks of the frame;

performing inter-prediction on the second block using a second inter-frame prediction motion vector to calculate a second residual block;

selecting one of the first coding process or the second coding process to encode the second block based on a comparison of a magnitude of the second inter-frame prediction motion vector to the threshold value;

if the first coding process is selected, performing the first coding process by:

entropy coding the second residual block; and including the entropy coded second residual block in the encoded video bitstream; and if the second coding process is selected, performing the second coding process by:

encoding the second residual block to form a second encoded residual block;

entropy coding the second encoded residual block to include in the encoded video bitstream;

decoding the second encoded residual block to form a third residual block;

subtracting the third residual block from the second residual block to form a second difference residual;

entropy coding the second difference residual block to form a second encoded difference residual block; and including the encoded second difference residual block in the encoded video bitstream.

7. The method of claim 6 wherein encoding the first residual block comprises:

transforming the first residual block to form a first transformed residual block; and quantizing the first transformed residual block using a first quantization value to form a first quantized residual block; and wherein encoding the second residual block comprises:

transforming the second residual block to form a second transformed residual block; and quantizing the second transformed residual block using a second quantization value to form a second quantized residual block.

8. The method of claim 7 wherein the first quantization value and the second quantization value are different values.

9. The method of claim 7 wherein the first quantization value and the second quantization value are equal values.

10. The method of claim 1, further comprising:

adding bits to a header in the encoded video bitstream to indicate that the encoded difference residual block is included in the encoded video bitstream.

11. An apparatus for encoding a digital video stream including a plurality of frames, the apparatus comprising:

a memory; and a processor configured to execute instructions stored in the memory to:

select a block of a frame of the plurality of frames, the block being one of a plurality of blocks of the frame;

perform inter-prediction on the block using an inter-frame prediction motion vector to calculate a first residual block by:

generating a reference block using the inter-frame prediction motion vector; and obtaining a difference between the block and the reference block as the first residual block;

select one of a first coding process or a second coding process to encode the first residual block based on a comparison of a magnitude of the inter-frame prediction motion vector to a threshold value;

if the first coding process is selected, perform the first coding process as a lossless encoding process by:

entropy coding the first residual block; and including the entropy coded first residual block in an encoded video bitstream; and if the second coding process is selected, perform the second coding process as a lossless encoding process by:

encoding the first residual block to form an encoded residual block using a lossy encoding process;

entropy coding the encoded residual block to include in the encoded video bitstream;

decoding the encoded residual block to form a second residual block;

subtracting the second residual block from the first residual block to form a difference residual;

entropy coding the difference residual block to form an encoded difference residual block; and including the encoded difference residual block in the encoded video bitstream.

12. The apparatus of claim 11 wherein the processor is configured to select the one of the first coding process or the second coding process by:

selecting the first coding process when an absolute value of the magnitude is less than or equal to the threshold value; and selecting the second coding process when the absolute value of the magnitude is greater than the threshold value.

13. The apparatus of claim 11 wherein the processor is configured to encode the first residual block using a quantization step and wherein the processor is configured to select an optimized quantization value for the quantization step.

14. A method for decoding an encoded video bitstream including a plurality of encoded frames, the method comprising:

receiving an encoded residual block of a frame of the plurality of encoded frames, the encoded residual block being one of a plurality of encoded residual blocks of the frame;

determining whether an encoded difference residual block is associated with the encoded residual block;

determining whether the encoded residual block was inter-predicted;

when the encoded residual block was inter-predicted and no encoded difference residual block is associated with the encoded residual block, reconstructing a first block of a frame of a digital video stream by:
    entropy decoding the encoded residual block to form a residual block;
    generating a reference block using an inter-frame prediction motion vector; and
    adding the reference block to the residual block to reconstruct the first block of the frame of the digital video stream;

when the encoded residual block was inter-predicted and the encoded difference residual block is associated with the encoded residual block, reconstructing the first block of the frame of the digital video stream by:
    decoding the encoded residual block to form a second residual block by:
        entropy decoding the encoded residual block to form a first quantized residual block;
        dequantizing the first quantized residual block to form a first transformed residual block; and
        inverse transforming the first transformed residual block to form the second residual block;
    entropy decoding the encoded difference residual block to form a difference residual block;
    adding the second residual block to the difference residual block;
    generating the reference block using the inter-frame prediction motion vector; and
    adding the reference block to a sum of the second residual block and the difference residual block to reconstruct the first block of the frame of the digital video stream.

15. The method of claim 14 wherein, when the encoded residual block was intra-predicted, the method comprises:
    decoding the encoded residual block to form the second residual block by:
        entropy decoding the encoded residual block to form a first quantized residual block;
        dequantizing the first quantized residual block to form a first transformed residual block; and
        inverse transforming the first transformed residual block to form the second residual block;
    entropy decoding the encoded difference residual block to form the difference residual block;
    adding the second residual block to the difference residual block;
    generating the reference block using intra-prediction; and
    adding the reference block to the sum of the second residual block and the difference residual block to reconstruct the first block of the frame of the digital video stream.

16. The method of claim 14, further comprising:
    receiving at least one bit from a header included in the encoded video bitstream indicating whether the encoded reference difference residual block is associated with the encoded residual block.

* * * * *